US012065188B2

(12) United States Patent
Yamada et al.

(10) Patent No.: US 12,065,188 B2
(45) Date of Patent: Aug. 20, 2024

(54) ELECTRODE STRUCTURE, STEERING WHEEL, AND METHOD FOR MANUFACTURING STEERING WHEEL

(71) Applicant: Panasonic Intellectual Property Management Co., Ltd., Osaka (JP)

(72) Inventors: Takumi Yamada, Osaka (JP); Yasuhiro Yamashita, Osaka (JP); Takateru Sawada, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 65 days.

(21) Appl. No.: 17/890,013

(22) Filed: Aug. 17, 2022

(65) Prior Publication Data

US 2023/0067577 A1 Mar. 2, 2023

(30) Foreign Application Priority Data

Aug. 27, 2021 (JP) .................................. 2021-139139

(51) Int. Cl.
*B62D 1/06* (2006.01)
*H01B 5/14* (2006.01)

(52) U.S. Cl.
CPC ........ *B62D 1/06* (2013.01); *H01B 5/14* (2013.01)

(58) Field of Classification Search
CPC .................................. B62D 1/046; B62D 1/06
See application file for complete search history.

(56) References Cited

U.S. PATENT DOCUMENTS

2020/0017136 A1 1/2020 Lammers et al.
2021/0016819 A1* 1/2021 Urushibata ............. B62D 1/06

2021/0206418 A1* 7/2021 Nakano .................. B32B 27/34
2021/0291229 A1* 9/2021 Hasegawa ............. G01L 1/2287
2021/0371000 A1* 12/2021 Nozoe .................... G01V 3/06
2021/0389842 A1* 12/2021 Fujiyoshi ............... G01B 7/00

FOREIGN PATENT DOCUMENTS

| KR | 20170074138 A | * | 6/2017 | |
| KR | 20170075576 A | * | 7/2017 | |
| WO | WO 2018145868 A1 | | 8/2018 | |
| WO | WO-2020183869 A1 | * | 9/2020 | ......... B62D 1/04 |
| WO | WO-2020194931 A1 | * | 10/2020 | ......... B32B 27/12 |
| WO | WO-2020217855 A1 | * | 10/2020 | ......... B06B 1/0292 |

OTHER PUBLICATIONS

USPTO Machine Translation (retrieved from FIT database) of the Description of WO 2020217855 A1, Hasegawa et al., Oct. 29, 2020. (Year: 2023).*
USPTO Machine Translation (retrieved from FIT database) of the Description of WO 2020183869 A1, Fujiyoshi, Aug. 17, 2020. (Year: 2023).*
USPTO Machine Translation (retrieved from FIT database) of the Description of KR 20170074138 A, Ji et al., Jun. 29, 2017. (Year: 2023).*

* cited by examiner

*Primary Examiner* — Daniel D Yabut
(74) *Attorney, Agent, or Firm* — Seed IP Law Group LLP

(57) ABSTRACT

The electrode structure is an electrode structure disposed in a steering wheel provided in a vehicle, the electrode structure including: an insulator; a first electrode disposed on a first surface of the insulator, the first surface being a surface facing a core metal of the steering wheel; a second electrode disposed on a second surface, the second surface being a surface opposite to the first surface of the insulator; a protrusion protruding from the insulator toward the core metal; and an engagement portion that is engaged with the core metal.

10 Claims, 7 Drawing Sheets

ELECTRODE STRUCTURE, STEERING WHEEL, AND METHOD FOR MANUFACTURING STEERING WHEEL

CROSS REFERENCE TO RELATED APPLICATION

The present application is based on and claims priority of Japanese Patent Application No. 2021-139139 filed on Aug. 27, 2021.

FIELD

The present disclosure relates to an electrode structure, a steering wheel, and a method for manufacturing a steering wheel.

BACKGROUND

Conventionally, a method for making a notch in a foam of a steering wheel using a cutting tool and introducing a conductor of a sensor into each of the first layer and the second layer of the notch has been disclosed (for example, see Patent Literature (PTL) 1).

Citation List

Patent Literature

PTL 1: International Publication No. 2018/145868

SUMMARY

The method according to PTL 1 can be improved upon.

In view of this, the electrode structure, the steering wheel, and the method for manufacturing the steering wheel of the present disclosure is capable of improving upon the above related art.

The electrode structure according to one aspect of the present disclosure is an electrode structure disposed in a steering wheel provided in a vehicle, the electrode structure including: an insulator; a first electrode disposed on first surface of the insulator, first surface being a surface facing a core metal of the steering wheel; a second electrode disposed on a second surface, the second surface being a surface opposite to first surface of the insulator; a protrusion protruding from the insulator toward the core metal; and an engagement portion that is engaged with the core metal.

It should be noted that these comprehensive or specific aspects may be realized in a system, device, method, recording medium, or computer program, and may be realized by any combination of the system, device, method, recording medium, and computer program.

An electrode structure or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
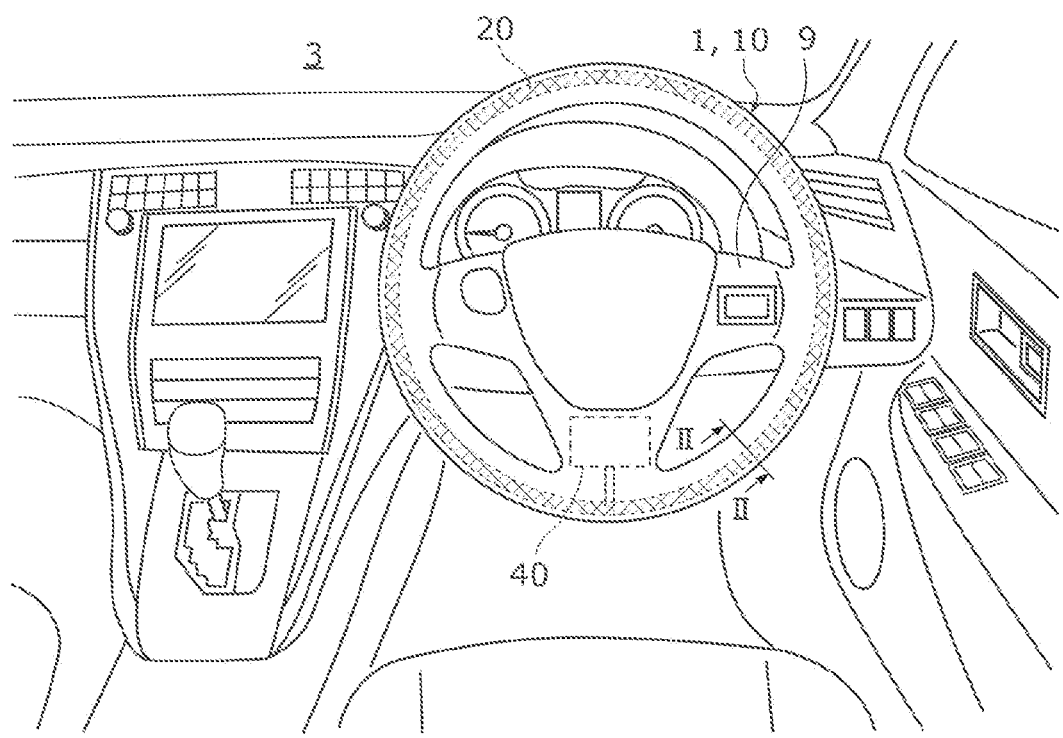
FIG. 1 is a diagram showing a passenger compartment of a vehicle in which a steering wheel according to an embodiment is disposed.

However, in the conventional method, the appearance may be deteriorated due to the notch formed in the foam of the steering wheel. In addition, the man-hours for making the notch and introducing the conductor of the sensor may increase, which may increase the manufacturing cost of the steering wheel.

Therefore, the electrode structure according to one aspect of the present disclosure is an electrode structure disposed in a steering wheel provided in a vehicle, the electrode structure including: an insulator; a first electrode disposed on a first surface of the insulator, the first surface being a surface facing a core metal of the steering wheel; a second electrode disposed on a second surface, the second surface being a surface opposite to the first surface of the insulator; a protrusion protruding from the insulator toward the core metal; and an engagement portion that is engaged with the core metal.

According to this, the electrode structure can be attached to the core metal in advance. Accordingly, when forming the steering wheel, the electrode structure can be disposed inside the steering wheel. For this reason, unlike the conventional case, it is not necessary to make a notch in the steering wheel after forming the steering wheel to dispose the first electrode and the second electrode. For this reason, it becomes difficult for the appearance of the steering wheel to deteriorate and for the man-hours related to the manufacture of the steering wheel to increase.

Therefore, the electrode structure can suppress the increase in the manufacturing cost of the steering wheel while the appearance of the steering wheel is secured.

In particular, in this electrode structure, the posture of the first electrode and the insulator with respect to the core metal can be ensured by the protrusion protruding from the insulator toward the core metal and the engagement portion that is engaged with the core metal. For this reason, the protrusion and the engagement portion can prevent the first electrode and the core metal from being electrically connected to each other. As a result, when the electrode structure is used for gripping detection of the steering wheel, it is possible to accurately detect that the driver's hand grips the steering wheel.

In addition, since the protrusion and the engagement portion can secure the posture of the first electrode and the insulator with respect to the core metal, the electrode structure can be reliably incorporated into the steering wheel at the time of resin molding of the steering wheel.

In addition, the protrusion can maintain the distance between the core metal and the first electrode, and the engagement portion engages the insulator with the core metal, so that the engagement portion can fix the insulator to the core metal. For this reason, it is possible to prevent the insulator from being displaced with respect to the core metal or rotationally displaced with respect to the circumferential direction of the steering wheel due to the pressure during resin molding of the steering wheel.

In addition, the electrode structure according to one aspect of the present disclosure is an electrode structure disposed in a steering wheel provided in a vehicle, the electrode structure including: an insulator made of a hard plastic; a first electrode disposed on a first surface of the insulator, the first surface being a surface facing a core metal of the steering wheel; a second electrode disposed on a second surface, the second surface being a surface opposite to first surface of the insulator; and an engagement portion that is engaged with the core metal.

Also in this electrode structure, since the insulator in which the first electrode and the second electrode are disposed comprises a hard plastic, for example, the electrode structure can be attached to the core metal in advance while ensuring the posture of the first electrode and the insulator with respect to the core metal. Accordingly, the same working effect as described above can be obtained.

In addition, the steering wheel according to one aspect of the present disclosure includes an electrode structure, the core metal, and a foam covering the electrode structure.

This steering wheel also has the same working effect as described above.

In addition, a method for manufacturing a steering wheel according to one aspect of the present disclosure, the method includes: engaging the engagement portion included in the electrode structure according to claim 1 with the core metal; and covering the electrode structure with a foam in a state where the engagement portion is engaged with the core metal.

This method for manufacturing the steering wheel also has the same working effect as described above.

In addition, in the electrode structure, the engagement portion includes a second recessed portion that is engaged with a first recessed portion of the core metal.

According to this, since the first recessed portion and the second recessed portion are engaged with each other, the engagement portion can fix the insulator to the core metal. For this reason, it is possible to prevent the insulator from being displaced with respect to the core metal or rotationally displaced with respect to the circumferential direction of the steering wheel due to the pressure during resin molding of the steering wheel.

In addition, in the electrode structure, in a cross section when the steering wheel is cut along a plane perpendicular to a circumferential direction of the steering wheel, the protrusion and the engagement portion sandwich the core metal, and the protrusion and the engagement portion are disposed at positions facing each other.

According to this, the engagement portion can support the insulator at the position corresponding to the position where the protrusion supports the insulator. For this reason, the protrusion and the engagement portion can be disposed in a state where the first electrode and the insulator are separated from the core metal so that the first electrode does not come into contact with the core metal.

In addition, when forming the steering wheel, it is possible to secure a space in which the foam can be filled between the first electrode and the insulator. For this reason, the foam can be resin-molded between the first electrode and the insulator.

In addition, it is possible to further prevent the insulator from being displaced with respect to the core metal or rotationally displaced with respect to the circumferential direction of the steering wheel due to the pressure during resin molding of the steering wheel.

In addition, in the electrode structure, the core metal includes a curved portion in a curved shape in a cross section when the steering wheel is cut along a plane perpendicular to a circumferential direction of the steering wheel, and the protrusion is disposed at a position facing the curved portion.

According to this, even if the core metal has a curved portion, the protrusion can be disposed in a state where the first electrode and the insulator are separated from the curved portion so that the first electrode does not come into contact with the core metal.

In addition, in the electrode structure, the protrusion and the engagement portion are formed integrally with the insulator.

According to this, it is possible to suppress an increase in the step of adhering the protrusion and the engagement portion to the insulator.

In addition, in the electrode structure, in a cross section when the steering wheel is cut along a plane perpendicular to a circumferential direction of the steering wheel, the insulator, the first electrode, and the second electrode are disposed at least in a range from an outer circumferential side of the steering wheel to a rear side of the vehicle in the steering wheel.

According to this, when the driver's hand grips the steering wheel, the electrode structure can be disposed at a place where the driver's hand easily comes into contact with the surface of the steering wheel. For this reason, the grip by the driver's hand can be reliably detected.

In addition, since it is not necessary to dispose the electrode structure over the entire steering wheel, it is possible to suppress an increase in material cost in the electrode structure.

In addition, in the electrode structure, the protrusion and the engagement portion include curved surface portions in which corners of respective contours of the protrusion and the engagement portion are rounded.

According to this, in manufacturing a steering wheel, for example, when filling the foam so as to cover the core metal, the insulator, the first electrode, and the second electrode, the foam can be flowed. For this reason, the circumference of the protrusion and the engagement portion can be reliably filled with the foam.

In addition, in the electrode structure, the insulator comprises a resin material, the first electrode includes a plated metal, a metal sheet, or a metal plate, and the second electrode includes a plated metal, a metal sheet, or a metal plate.

According to this, it is possible to form an insulator according to the shape and size of the core metal by using the resin material. In addition, since the first electrode and the second electrode can be disposed in the insulator, the member in which the insulator, the first electrode and the second electrode are integrated can be easily assembled to the core metal. Furthermore, if a certain strength is ensured in the insulator, the insulator can dispose the first electrode in a state where the first electrode is separated from the core metal.

In addition, in the electrode structure, an AC voltage is applied to the first electrode, the AC voltage having a same phase as a phase of an AC voltage applied to the second electrode.

According to this, the capacitance between the first electrode and the second electrode can be canceled or reduced. For this reason, if a control circuit for detecting the grip of the steering wheel by the driver's hand is used, the control circuit will be able to accurately detect the change in capacitance between the second electrode and the driver's hand that occurs when this hand grips the steering wheel.

In addition, in the electrode structure, the core metal is of an annular shape, and the insulator has a shape that allows the insulator to be disposed along a surface on an outer circumferential side of the core metal.

According to this, the insulator can be disposed according to the outer shape of the core metal. For this reason, the versatility of this electrode structure can be enhanced.

In addition, in the electrode structure, the first electrode includes a plated metal, a metal sheet, or a metal plate, and the second electrode includes a plated metal, a metal sheet, or a metal plate.

According to this, since the first electrode and the second electrode can be disposed in the insulator, the member in which the insulator, the first electrode and the second electrode are integrated can be easily assembled to the core metal. Furthermore, if a certain strength is ensured in the insulator, the insulator can dispose the first electrode in a state where the first electrode is separated from the core metal.

Hereinafter, embodiments will be specifically described with reference to the drawings.

It should be noted that all of the embodiments described below are comprehensive or specific examples. The numerical values, shapes, materials, components, arrangement positions and connection forms of the components, steps, the order of steps, and the like shown in the following embodiments are examples, and are not intended to limit the present disclosure. In addition, among the components in the following embodiments, the components not described in the independent claim indicating the broadest concept are described as arbitrary components.

In addition, each figure is a schematic diagram and is not necessarily exactly illustrated. In addition, in each figure, the same components are designated by the same reference numerals.

In addition, in the following embodiments, expressions such as approximately equidistant or T-shaped are used. For example, approximately equidistant intervals or T-shaped not only means that they are completely equidistant intervals or T-shaped, but also that they are substantially equidistant or T-shaped, that is, they include an error of about several percent. In addition, approximately equidistant intervals or T-shaped mean equidistant intervals or T-shaped to the extent that the effects of the present disclosure can be achieved. The same applies to other expressions using "approximately" and "shaped".

Embodiment

<Configuration: Steering Wheel 1>

FIG. 1 is a diagram showing a passenger compartment of vehicle 3 in which steering wheel 1 is arranged according to an embodiment.

As shown in FIG. 1, steering wheel 1 can give a steering angle to, for example, the steering wheel of vehicle 3.

Steering wheel 1 includes rim 10. Rim 10 is integrally formed with T-shaped spoke 9 disposed on the inner circumferential surface of rim 10.

Figure 2:
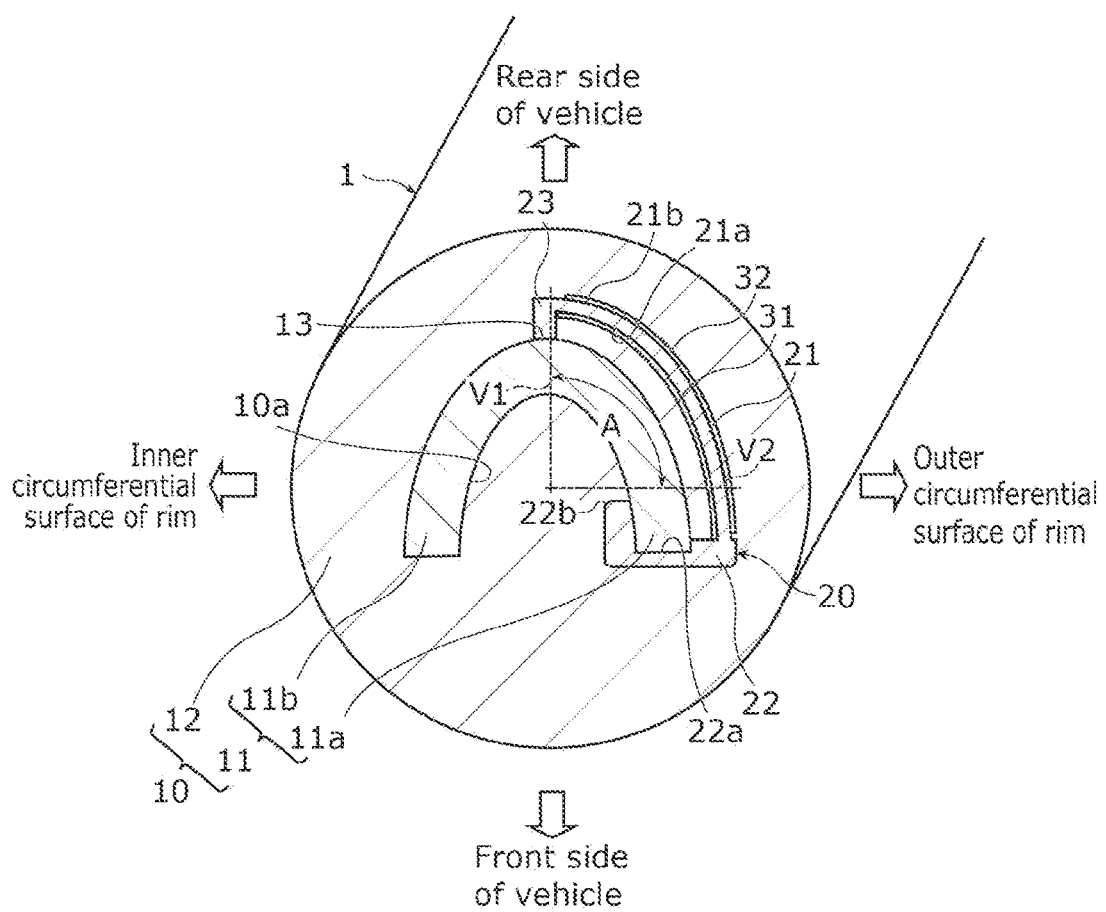
FIG. 2 is a cross-sectional view showing the steering wheel according to the embodiment taken along line II-II of FIG. 1.
Figure 3:
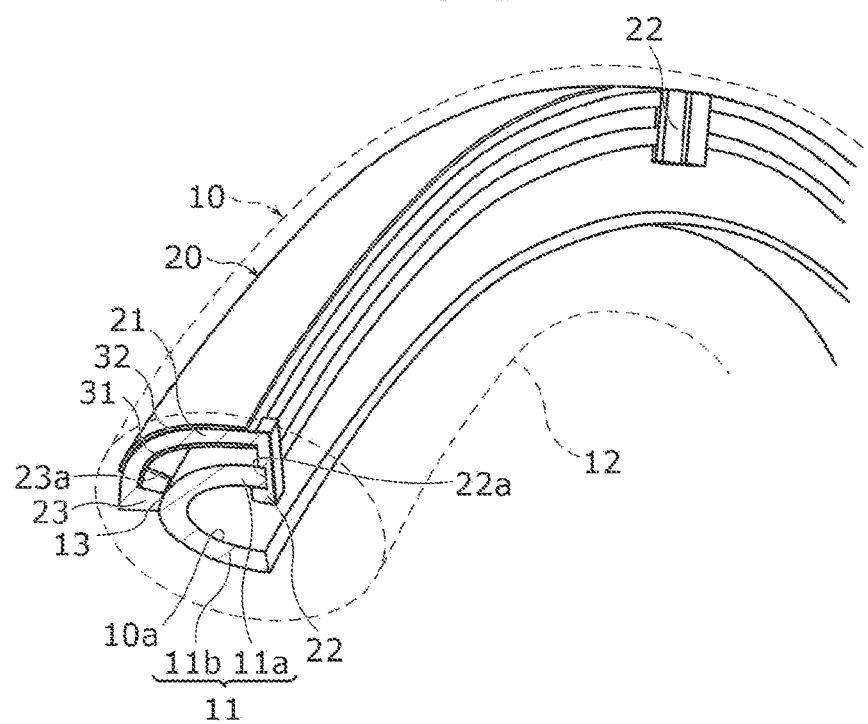
FIG. 3 is a cross-sectional perspective view showing the steering wheel according to the embodiment.

As shown in FIG. 2 and FIG. 3, rim 10 includes core metal 11, electrode structure 20, and foam 12 that covers electrode structure 20. Here, FIG. 2 is a cross-sectional view showing steering wheel 1 of the embodiment taken along line II-II of FIG. 1. FIG. 3 is a cross-sectional perspective view showing steering wheel 1 according to the embodiment. In addition, in FIG. 3, the contour of foam 12 is shown by a broken line.

[Core Metal 11]

Core metal 11 is a metal annular core. Specifically, core metal 11 includes annular first portion 11a and annular second portion 11b disposed on the outer circumferential side of first portion 11a. One end edge of first portion 11a and one end edge of second portion 11b are coupled to each other. That is, core metal 11 has a cross section that is U-shaped, V-shaped, J-shaped, C-shaped, or the like (hereinafter, may be referred to as a cross section of core metal 11) when core metal 11 is cut along a plane perpendicular to the circumferential direction of core metal 11.

In addition, since the cross section of core metal 11 is U-shaped, V-shaped, J-shaped, C-shaped, or the like, first recessed portion 10a is formed between first portion 11a and second portion 11b. First recessed portion 10a is a recessed portion in an annular shape. In the present embodiment, first recessed portion 10a is formed on the front side of vehicle 3 in rim 10 (the side opposite to the seat side with respect to rim 10).

In addition, core metal 11 has curved portion 13 in a curved shape. Specifically, curved portion 13 is a surface on the outer circumferential side of core metal 11 in the cross section of core metal 11, and is formed at a connecting portion between first portion 11a and second portion 11b.

[Electrode Structure 20]

Electrode structure 20 is used as a device for detecting the grip of steering wheel 1 by the driver's hand. Specifically, control circuit 40 capable of detecting the grip of steering wheel 1 by the driver's hand is connected to electrode structure 20. When rim 10 is gripped by the driver's hand, the capacitance between the electrode of electrode structure 20 and the hand changes. Control circuit 40 detects the grip from the electrode of electrode structure 20 based on an output signal in which the capacitance has changed. Specifically, control circuit 40 measures the capacitance of the electrode or a value (change amount) corresponding to the capacitance, and based on the value, the grip of rim 10 by the driver's hand is detected. Such control circuit 40 is configured by a dedicated circuit or a general-purpose processor. In addition, control circuit 40 is embedded in spoke 9 of FIG. 1, for example.

In addition, electrode structure 20 is disposed in steering wheel 1 provided in vehicle 3. In the present embodiment, electrode structure 20 is embedded in rim 10 of steering wheel 1. Specifically, electrode structure 20 includes insulator 21, engagement portion 22, protrusion 23, first electrode 31, and second electrode 32.

Insulator 21 is of an annular shape similar to that of core metal 11, and is disposed along the surface on the outer circumferential side of core metal 11 so as to be concentric with core metal 11. That is, insulator 21 has a larger diameter than core metal 11.

In addition, first electrode 31 is disposed on first surface 21a, which is the surface of insulator 21 facing core metal 11, and second electrode 32 is disposed on second surface 21b, which is the surface opposite to first surface 21a of insulator 21. Insulator 21 can be disposed so that first electrode 31 and second electrode 32 overlap each other so that first electrode 31 and second electrode 32 are not electrically connected to each other. Such insulator 21 comprises a resin material such as a hard plastic such as polycarbonate, polybutylene terephthalate, or the like.

In addition, a certain plate thickness is secured in insulator 21. The constant plate thickness is, for example, a thickness of insulator 21 having a thickness of about several mm. Since insulator 21 secures a constant plate thickness, rigidity is secured. For this reason, when steering wheel 1 is resin-molded, insulator 21 is not easily deformed and can maintain its posture.

In addition, insulator 21 is supported by engagement portion 22 and is disposed in a state of being separated from core metal 11 by a predetermined distance. In other words, first electrode 31 disposed in insulator 21 is disposed in a state of being separated from core metal 11 by a predetermined distance. In addition, first electrode 31 and foam 12 are disposed between insulator 21 and core metal 11.

Engagement portion 22 is a support piece capable of supporting insulator 21 to core metal 11. Specifically, engagement portion 22 includes second recessed portion 22a that engages with first recessed portion 10a formed in core metal 11. A part of engagement portion 22 is inserted into first recessed portion 10a of core metal 11, and the end of first portion 11a of core metal 11 is inserted into second recessed portion 22a, so that engagement portion 22 engages with first recessed portion 10a formed in core metal 11. Accordingly, engagement portion 22 is coupled to core metal 11.

Here, the end of first portion 11a of core metal 11 is the tip portion of first portion 11a which is the front side of vehicle 3 in the cross section of core metal 11.

In addition, engagement portion 22 includes curved surface portion 22b in which the corners of the contour of engagement portion 22 are rounded. Specifically, in engagement portion 22, a predetermined radius of R is added to the corner so that the corner formed in engagement portion 22 is rounded. Curved surface portion 22b may be formed on all the portions where engagement portion 22 comes into contact with foam 12. Accordingly, when foam 12 is filled, foam 12 flows, so that the circumference of engagement portion 22 is surely filled with foam 12.

In addition, engagement portion 22 is integrally configured with insulator 21, and is inseparable from insulator 21 without being destroyed. It should be noted that engagement portion 22 may be a separate body that can be separated from insulator 21 without being destroyed. In this case, for example, engagement portion 22 may be coupled to insulator 21 by coupling a recess formed in engagement portion 22 with a projection formed in insulator 21. In addition, engagement portion 22 may be coupled to insulator 21 by an adhesive, a coupling member, or the like.

In addition, a plurality of engagement portions 22 are disposed on core metal 11 and insulator 21. For example, four or eight engagement portions 22 may be disposed on core metal 11 and insulator 21. It should be noted that the number of engagement portions 22 shown in the present disclosure is merely an example, and is not limited to the number shown in the present disclosure. In addition, a plurality of sets including one or more engagement portions 22 as one set may be disposed on rim 10 at approximately equal intervals.

In addition, engagement portion 22 comprises a resin material such as polycarbonate and polybutylene terephthalate.

Protrusion 23 is disposed at a position facing curved portion 13 of core metal 11. In addition, protrusion 23 protrudes from insulator 21 toward core metal 11. The tip of protrusion 23 abuts against core metal 11. That is, protrusion 23 is disposed between insulator 21 and core metal 11. For this reason, protrusion 23 can maintain the posture of insulator 21 with respect to core metal 11 so that insulator 21 and first electrode 31 do not come into contact with core metal 11.

In addition, protrusion 23 includes curved surface portion 22b in which the corners of the contour of protrusion 23 are rounded. Specifically, in protrusion 23, a predetermined radius of R is added to the corner portion so that the corner portion formed in protrusion 23 is rounded. Accordingly, when foam 12 is filled, foam 12 flows, so that the circumference of protrusion 23 is surely filled with foam 12.

In addition, protrusion 23 is integrally formed with insulator 21, and is inseparable from insulator 21 without being destroyed. Protrusion 23 may be a separate body that can be separated from insulator 21 without being destroyed. In this case, for example, protrusion 23 may be coupled to insulator 21 by coupling a recess formed in protrusion 23 with a projection formed in insulator 21. In addition, protrusion 23 may be coupled to insulator 21 by an adhesive, a coupling member, or the like.

In addition, a plurality of protrusions 23 are disposed on core metal 11 and insulator 21. For example, four or eight protrusions 23 may be disposed on core 11 and insulator 21. The number of protrusions 23 shown in the present disclosure is merely an example, and is not limited to the number shown in the present disclosure. In addition, protrusions 23 may be disposed at approximately equal intervals on core metal 11 and insulator 21.

Here, the relationship between insulator 21, engagement portion 22, and protrusion 23 will be described.

In the present embodiment, engagement portion 22 is disposed at one end of insulator 21 in a cross section when insulator 21 is cut along a plane perpendicular to the circumferential direction of insulator 21 (hereinafter, may be referred to as a cross section of insulator 21). In addition, protrusion 23 is disposed at the other end of insulator 21 in the cross section of insulator 21. For this reason, when the cross section of insulator 21 is viewed, one end of insulator 21 is supported by engagement portion 22, and the other end of insulator 21 is supported by protrusion 23. Accordingly, protrusion 23 and engagement portion 22 can maintain the posture of insulator 21 with respect to core metal 11 so that insulator 21 and first electrode 31 are separated from core metal 11.

In addition, protrusion 23 comprises a resin material such as polycarbonate, polybutylene terephthalate, or the like.

Here, the relationship between core metal 11, engagement portion 22, and protrusion 23 will be described.

In the present embodiment, in the cross section when rim 10 is cut along a plane perpendicular to the circumferential direction of rim 10 (hereinafter, may be referred to as a cross section of rim 10), protrusion 23 and engagement portion 22 sandwich core metal 11, and protrusion 23 and engagement portion 22 are disposed at positions facing each other via core metal 11. Specifically, since a plurality of protrusions 23 and a plurality of engagement portions 22 are arranged in insulator 21, respectively, the plurality of protrusions 23 and the plurality of engagement portions 22 are arranged in insulator 21 at approximately equal intervals so that the plurality of protrusions 23 and the plurality of engagement portions 22 correspond to each other on a one-to-one, one-to-many, or many-to-one basis. That is, in the cross section of rim 10, protrusion 23 disposed at the other end of insulator 21 and engagement portion 22 disposed at one end of insulator 21 are disposed so as to sandwich core metal 11. For this reason, electrode structure 20 can be firmly attached to core metal 11.

First electrode 31 includes a plated metal, a metal sheet, or a metal plate. When first electrode 31 is a metal sheet or a metal plate, the metal sheet or the metal plate is attached to first surface 21a of insulator 21 by an adhesive or the like. First electrode 31 is a metal containing, for example, copper or aluminum.

In addition, first electrode 31 is of an annular shape similar to that of insulator 21. First electrode 31 is disposed on first surface 21a of insulator 21, which is the surface of steering wheel 1 facing core metal 11. That is, first electrode 31 is disposed along the inner circumferential surface of insulator 21 facing core metal 11 via foam 12. In addition, first electrode 31 is disposed apart from core metal 11, and foam 12 is filled between first electrode 31 and core metal 11. For this reason, first electrode 31 is not electrically connected to core metal 11.

Figure 4:
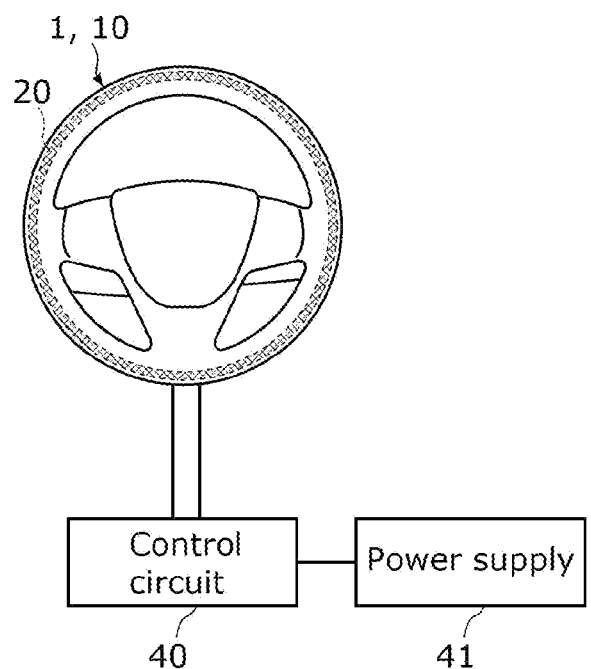
FIG. 4 is a block diagram showing the steering wheel according to the embodiment.

In addition, an AC voltage having the same phase as the AC voltage applied to second electrode 32 is applied to first electrode 31. As shown in FIG. 4, the AC voltage applied to first electrode 31 is an AC voltage applied from power supply 41 by control circuit 40 controlling power supply 41. Here, FIG. 4 is a block diagram showing steering wheel 1 in the embodiment.

Here, power supply 41 in FIG. 4 can apply an AC voltage to first electrode 31 and second electrode 32 via the harness by being controlled by control circuit 40.

As shown in FIG. 2 and FIG. 3, by applying an AC voltage having the same phase to first electrode 31 and second electrode 32, the capacitance between first electrode 31 and second electrode 32 can be canceled out or reduced. For this reason, control circuit 40 can detect the change in capacitance generated between second electrode 32 and the driver's hand.

Second electrode 32 includes a plated metal, a metal sheet, or a metal plate. When second electrode 32 is a metal sheet or a metal plate, the metal sheet or the metal plate is attached to second surface 21b of insulator 21 by an adhesive or the like. Second electrode 32 is, for example, a metal containing copper, aluminum, or the like.

In addition, second electrode 32 is of an annular shape similar to that of insulator 21. Second electrode 32 is disposed on second surface 21b, which is the surface opposite to first surface 21a of insulator 21. That is, second electrode 32 is disposed along the surface on the outer circumferential side of insulator 21 so as to sandwich insulator 21 together with first electrode 31.

In addition, an AC voltage is applied to second electrode 32. The AC voltage applied to second electrode 32 is an AC voltage applied from power supply 41 by control circuit 40 controlling power supply 41 in FIG. 4. Here, since second electrode 32 is disposed on the surface on the outer circumferential side of insulator 21, when the portion of rim 10 where second electrode 32 is disposed is gripped by the driver's hand, a capacitance is formed between second electrode 32 and the hand. Therefore, control circuit 40 can detect the grip of rim 10 by hand according to the change in the capacitance.

In addition, in first electrode 31 and second electrode 32, when first electrode 31 and second electrode 32 are viewed by overlapping first electrode 31 and second electrode 32, first electrode 31 covers all of second electrode 32 and the surface area where first electrode 31 is disposed on first surface 21a is larger than the surface area where second electrode 32 is disposed on second surface 21b. For this reason, first electrode 31 can shield second electrode 32 so as to suppress a change in capacitance between second electrode 32 and core metal 11.

In addition, in a cross section when steering wheel 1 is cut along a plane perpendicular to the circumferential direction of rim 10 of steering wheel 1 (hereinafter, a cross section of steering wheel 1), insulator 21, first electrode 31, and second electrode 32 are disposed at least in the range from the outer circumferential side portion of rim 10 of steering wheel 1 to the rear side portion of vehicle 3 in rim 10.

In the present embodiment, insulator 21, first electrode 31, and second electrode 32 are disposed along the circumferential direction of the cross section of rim 10 over a range of at least 1/4 circumference. In FIG. 2, insulator 21, first electrode 31, and second electrode 32 are disposed over a range larger than range A between two straight lines V1 and V2 indicated by the alternate long and short dash lines. In this way, insulator 21, first electrode 31, and second electrode 32 are disposed at a place where the hand easily comes into contact with rim 10 when the driver's hand grips rim 10, so that electrode structure 20 can detect the grip by the driver's hand with high accuracy.

[Foam 12]

Foam 12 is a portion gripped by the driver's hand and constitutes the outer shell of rim 10 in steering wheel 1. Foam 12 comprises a resin material of urethane resin such as polyurethane that covers electrode structure 20. Foam 12 has insulator 21, engagement portion 22, protrusion 23, first electrode 31, second electrode 32, and core metal 11 embedded therein. That is, insulator 21, engagement portion 22, protrusion 23, first electrode 31, second electrode 32, and core metal 11 are covered with foam 12 so as not to be exposed from foam 12.

<Method for Manufacturing Steering Wheel 1>

Figure 5:
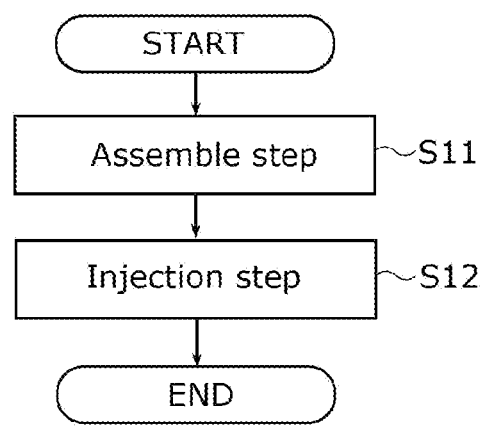
FIG. 5 is a flowchart showing a method for manufacturing a steering wheel according to an embodiment.

FIG. 5 is a flowchart showing a method for manufacturing steering wheel 1 according to the embodiment.

First, as shown in FIG. 5, core metal 11 and electrode structure 20 are prepared. Second recessed portion 22a of engagement portion 22 in electrode structure 20 is engaged with first recessed portion 10a of core metal 11 and they are assembled (S11: assemble step). Accordingly, an assembled structure in which electrode structure 20 is assembled to core metal 11, which is in a state where engagement portion 22 included in electrode structure 20 is engaged with core metal 11, is obtained.

Next, the assembled structure is fixed in the cavity of the mold and the mold is fastened. Then, electrode structure 20 is covered with foam 12 in a state where engagement portion 22 is engaged with core metal 11. That is, the injection molding resin is poured into the cavity in the mold from the gate formed in the mold (S12: injection step). The injection molding resin is a resin material of a urethane resin such as polyurethane and the like.

Accordingly, foam 12 can cover electrode structure 20 in a state where engagement portion 22 is engaged with core metal 11. In this way, steering wheel 1 can be obtained.

<Working Effect>

The working effect of electrode structure 20, steering wheel 1, and the method for manufacturing steering wheel 1 in the present embodiment will be described.

As described above, electrode structure 20 of the present embodiment is electrode structure 20 disposed in steering wheel 1 provided in vehicle 3, electrode structure 20 including: insulator 21; first electrode 31 disposed on first surface 21a of insulator 21, first surface 21a being a surface facing core metal 11 of steering wheel 1; second electrode 32 disposed on second surface 21b, second surface 21b being a surface opposite to first surface 21a of insulator 21; protrusion 23 protruding from insulator 21 toward core metal 11; and engagement portion 22 that is engaged with core metal 11.

According to this, electrode structure 20 can be attached to core metal 11 in advance. Accordingly, when forming steering wheel 1, electrode structure 20 can be disposed inside steering wheel 1. For this reason, unlike the conventional case, it is not necessary to make a notch in the steering wheel after forming the steering wheel to dispose the first electrode and the second electrode. For this reason, in the present embodiment, it becomes difficult for the appearance of steering wheel 1 to deteriorate and for the man-hours related to the manufacture of steering wheel 1 to increase.

Therefore, electrode structure 20 can suppress an increase in the manufacturing cost of steering wheel 1 while the appearance of steering wheel 1 is secured.

In particular, in this electrode structure 20, the posture of first electrode 31 and insulator 21 with respect to core metal 11 can be secured by protrusion 23 protruding from insulator 21 toward core metal 11 and engagement portion 22 engaged with core metal 11. For this reason, protrusion 23 and engagement portion 22 can prevent first electrode 31 and core metal 11 from being electrically connected to each other. As a result, when electrode structure 20 is used for gripping detection of steering wheel 1, it is possible to accurately detect that the driver's hand grips steering wheel 1.

In addition, since protrusion 23 and engagement portion 22 can secure the postures of first electrode 31 and insulator 21 with respect to core metal 11, electrode structure 20 is reliably incorporated into steering wheel 1 when steering wheel 1 is resin-molded.

In addition, protrusion 23 can maintain the distance between core metal 11 and first electrode 31, and engagement portion 22 engages insulator 21 with core metal 11, so that engagement portion 22 can fix insulator 21 to core metal 11. For this reason, it is possible to prevent insulator 21 from being displaced with respect to core metal 11 or being rotationally displaced with respect to the circumferential direction of steering wheel 1 due to the pressure at the time of resin molding of steering wheel 1.

In addition, electrode structure 20 of the present embodiment is electrode structure 20 disposed in steering wheel 1 provided in vehicle 3, electrode structure 20 including: insulator 21 made of hard plastic; first electrode 31 disposed on first surface 21a of insulator 21, first surface 21a being a surface facing core metal 11 of steering wheel 1; second electrode 32 disposed on second surface 21b, second surface 21b being a surface opposite to first surface 21a of insulator 21; and engagement portion 22 that is engaged with core metal 11.

Also in this electrode structure 20, since insulator 21 in which first electrode 31 and second electrode 32 are disposed comprises a hard plastic, for example, electrode structure 20 can be attached to core metal 11 in advance, while the postures of first electrode 31 and insulator 21 with respect to core metal 11 are secured. Accordingly, the same working effect as described above can be obtained.

In addition, steering wheel 1 of the present embodiment includes electrode structure 20, core metal 11, and foam 12 that covers electrode structure 20.

This steering wheel 1 also has the same working effect as described above.

In addition, in the method for manufacturing steering wheel 1 of the present embodiment, engagement portion 22 provided in electrode structure 20 is engaged with core metal 11. Then, electrode structure 20 is covered with foam 12 in a state where engagement portion 22 is engaged with core metal 11.

The method for manufacturing steering wheel 1 also has the same working effect as described above.

In addition, in electrode structure 20 of the present embodiment, engagement portion 22 includes second recessed portion 22a that engages with first recessed portion 10a formed in core metal 11.

According to this, since first recessed portion 10a and second recessed portion 22a are engaged with each other, engagement portion 22 can fix insulator 21 to core metal 11. For this reason, it is possible to further prevent insulator 21 from being displaced with respect to core metal 11 or rotationally displaced with respect to the circumferential direction of steering wheel 1 due to the pressure at the time of resin molding of steering wheel 1.

In addition, in electrode structure 20 of the present embodiment, in the cross section when steering wheel 1 is cut along a plane perpendicular to the circumferential direction of steering wheel 1, protrusion 23 and engagement portion 22 sandwich core metal 11, and protrusion 23 and engagement portion 22 are disposed at positions facing each other.

According to this, engagement portion 22 can support insulator 21 at a position corresponding to the position where protrusion 23 supports insulator 21. For this reason, protrusion 23 and engagement portion 22 can be disposed in a state where first electrode 31 and insulator 21 are separated from core metal 11 so that first electrode 31 does not come into contact with core metal 11.

In addition, when forming steering wheel 1, it is possible to secure a space in which foam 12 can be filled between first electrode 31 and insulator 21. For this reason, foam 12 can be resin-molded between first electrode 31 and insulator 21.

In addition, it is possible to further prevent insulator 21 from being displaced with respect to core metal 11 or rotationally displaced with respect to the circumferential direction of steering wheel 1 due to the pressure at the time of resin molding of steering wheel 1.

In addition, in electrode structure 20 of the present embodiment, core metal 11 has curved portion 13 in a curved shape in a cross section when steering wheel 1 is cut along a plane perpendicular to the circumferential direction of steering wheel 1. Then, protrusion 23 is disposed at a position facing curved portion 13.

According to this, even if core metal 11 has curved portion 13, protrusion 23 can be disposed in a state where first electrode 31 and insulator 21 are separated from curved portion 13 so that first electrode 31 does not come into contact with core metal 11.

In addition, in electrode structure 20 of the present embodiment, protrusion 23 and engagement portion 22 are integrally formed with insulator 21.

According to this, it is possible to suppress an increase in the number of steps of adhering protrusion 23 and engagement portion 22 to insulator 21 and the like.

In addition, in electrode structure 20 of the present embodiment, insulator 21, first electrode 31, and second electrode 32 are disposed at least in a range from an outer circumferential side of steering wheel 1 to a rear side of vehicle 3 in steering wheel 1 when steering wheel 1 is cut along a plane perpendicular to the circumferential direction of steering wheel 1.

According to this, when the driver's hand grips steering wheel 1, electrode structure 20 can be disposed at a position where the driver's hand easily comes into contact with the surface of steering wheel 1. For this reason, the grip by the driver's hand can be reliably detected.

In addition, since it is not necessary to dispose electrode structure 20 over entire steering wheel 1, it is possible to suppress an increase in material cost in electrode structure 20.

In addition, in electrode structure 20 of the present embodiment, protrusion 23 and engagement portion 22 include curved surface portions 22b in which the corners of the respective contours of protrusion 23 and engagement portion 22 are rounded.

According to this, in manufacturing steering wheel 1, for example, when foam 12 is filled so as to cover core metal 11, insulator 21, first electrode 31, and second electrode 32, foam 12 can be flowed. For this reason, the circumference of protrusion 23 and engagement portion 22 can be reliably filled with foam 12.

In addition, in electrode structure 20 of the present embodiment, insulator 21 comprises a resin material. In addition, first electrode 31 includes a plated metal, a metal sheet, or a metal plate. Second electrode 32 includes a plated metal, a metal sheet, or a metal plate.

According to this, insulator 21 can be formed according to the shape and size of core metal 11 by using a resin material. In addition, since first electrode 31 and second electrode 32 can be disposed in insulator 21, a member in which insulator 21, first electrode 31, and second electrode 32 are integrated can be easily assembled to core metal 11. Furthermore, if a certain strength is secured in insulator 21, insulator 21 can dispose first electrode 31 in a state where first electrode 31 is separated from core metal 11.

In addition, in electrode structure 20 of the present embodiment, an AC voltage having the same phase as the AC voltage applied to second electrode 32 is applied to first electrode 31.

According to this, the capacitance between first electrode 31 and second electrode 32 can be canceled or reduced. For this reason, if control circuit 40 for detecting the grip of steering wheel 1 by the driver's hand is used, control circuit 40 will be able to accurately detect the change in capacitance between second electrode 32 and the driver's hand that occurs when this hand grips steering wheel 1.

In addition, in electrode structure 20 of the present embodiment, core metal 11 is of an annular shape. Insulator 21 has a shape that allows insulator 21 to be disposed along the surface on the outer circumferential side of core metal 11.

According to this, insulator 21 can be disposed according to the outer shape of core metal 11. For this reason, the versatility of electrode structure 20 can be enhanced.

In addition, in electrode structure 20 of the present embodiment, first electrode 31 includes a plated metal, a metal sheet, or a metal plate. Second electrode 32 includes a plated metal, a metal sheet, or a metal plate.

According to this, since first electrode 31 and second electrode 32 can be disposed in insulator 21, the member in which insulator 21, first electrode 31 and second electrode 32 are integrated can be easily assembled to core metal 11. Furthermore, if a certain strength is secured in insulator 21, insulator 21 can dispose first electrode 31 in a state where first electrode 31 is separated from core metal 11.

(Variation 1 of the Embodiment)

Electrode structure 20 and steering wheel 1 of the present variation are different from the electrode structure and the steering wheel of the embodiment in that engagement portion 122a is engaged with core metal 11. In the configurations and functions of electrode structure 20 and steering wheel 1 of the present variation, the same reference numerals are designated for the same configurations and functions as the configurations and functions of the electrode structure and the steering wheel of the embodiment, and the detailed description about the configurations and functions is omitted.

Figure 6:
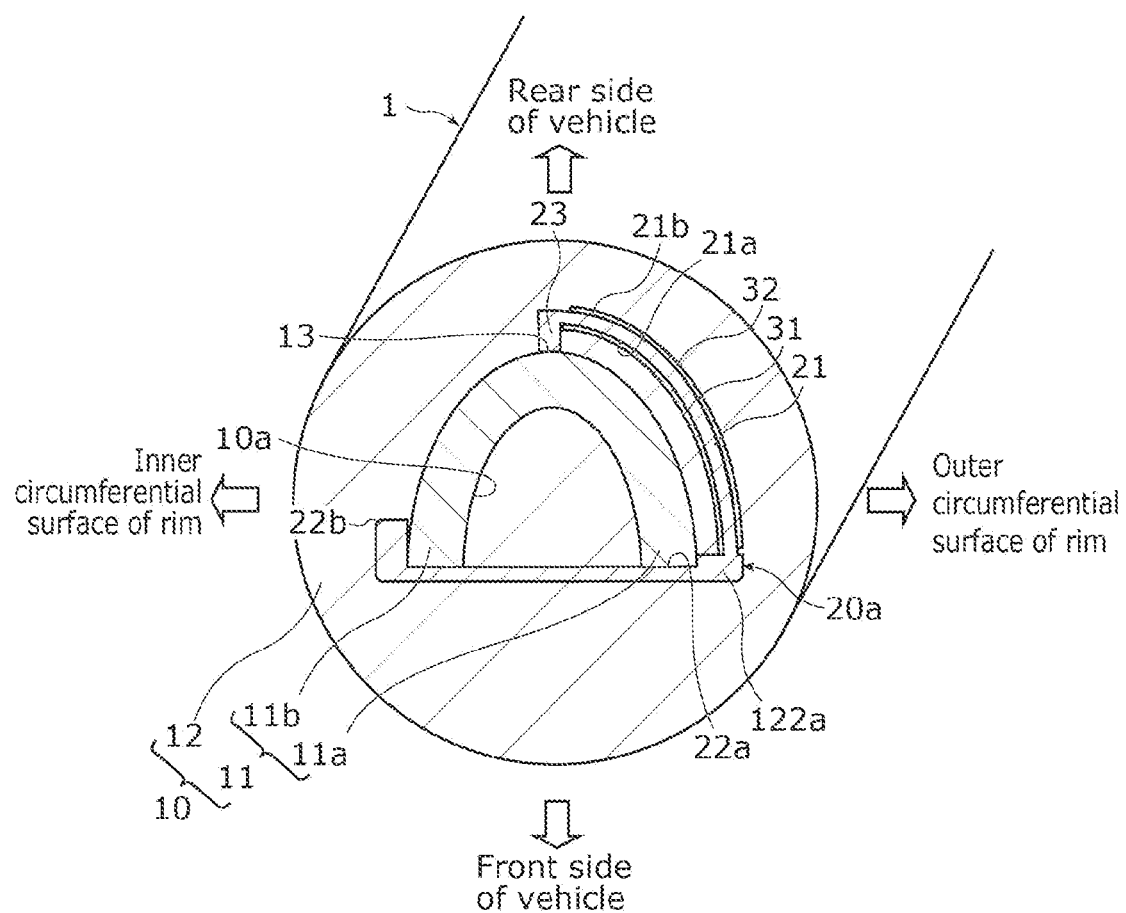
FIG. 6 is a cross-sectional view showing the steering wheel according to Variation 1 of the embodiment.

FIG. 6 is a cross-sectional view showing steering wheel 1 in Variation 1 of the embodiment.

As shown in FIG. 6, engagement portion 122a of the present variation is engaged with core metal 11 by being disposed over first portion 11a and second portion 11b of core metal 11. That is, second recessed portion 22a of engagement portion 122a is engaged with core metal 11 so as to sandwich core metal 11 from first portion 11a to second portion 11b of core metal 11. Accordingly, engagement portion 122a and core metal 11 can be more firmly coupled. For this reason, it is possible to prevent insulator 21 from being displaced with respect to core metal 11 or being rotationally displaced with respect to the circumferential direction of steering wheel 1 due to the pressure at the time of resin molding of steering wheel 1.

(Variation 2 of the Embodiment)

Electrode structure 20 and steering wheel 1 of the present variation are different from the electrode structure and the steering wheel of the embodiment in that engagement portion 122b is engaged with second portion 11b of core metal 11. In the configurations and functions of electrode structure 20 and steering wheel 1 of the present variation, the same reference numerals are designated for the same configurations and functions as the configurations and functions of the electrode structure and the steering wheel of the embodiment, and the detailed description about the configurations and functions is omitted.

Figure 7:
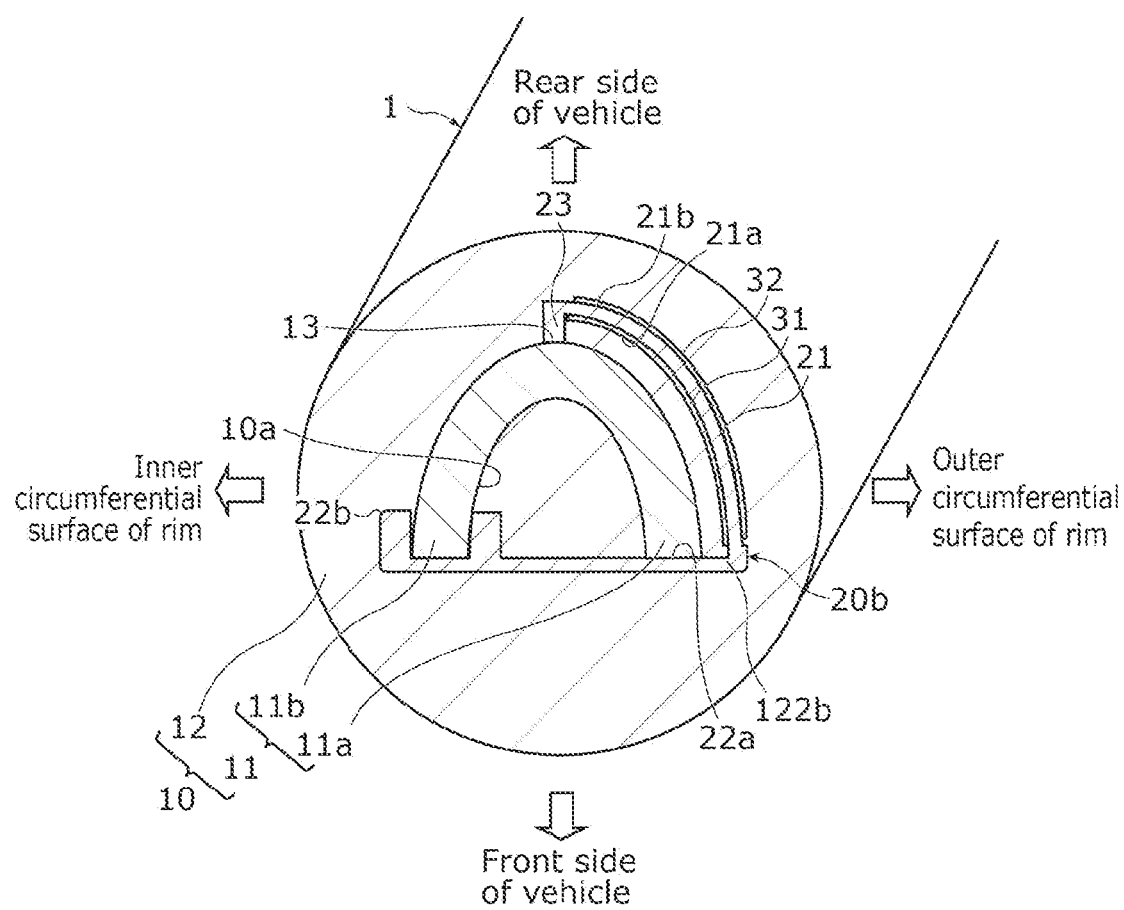
FIG. 7 is a cross-sectional view showing the steering wheel according to Variation 2 of the embodiment.

FIG. 7 is a cross-sectional view showing steering wheel 1 in Variation 2 of the embodiment.

As shown in FIG. 7, engagement portion 122b of the present variation is engaged with second portion 11b of core metal 11. Specifically, engagement portion 122b extends from insulator 21 to second portion 11b of core metal 11. In addition, first portion 11a of core metal 11 abuts against engagement portion 122b. In addition, second recessed portion 22a of engagement portion 122b is engaged with second portion 11b of core metal 11. Accordingly, engagement portion 122b is coupled to second portion 11b in a state of abutting against first portion 11a of core metal 11, so that engagement portion 122b and core metal 11 can be more firmly coupled. For this reason, it is possible to prevent insulator 21 from being displaced with respect to core metal 11 or being rotationally displaced with respect to the circumferential direction of steering wheel 1 due to the pressure at the time of resin molding of steering wheel 1.

(Variation 3 of the Embodiment)

Electrode structure 20 and steering wheel 1 of the present variation are different from the electrode structure and the steering wheel of the embodiment in that engagement portion 122c is engaged with first portion 11a and second portion 11b of core metal 11. In the configurations and functions of electrode structure 20 and steering wheel 1 of the present variation, the same reference numerals are designated for the same configurations and functions as the configurations and functions of the electrode structure and the steering wheel of the embodiment, and the detailed description about the configurations and functions is omitted.

Figure 8:
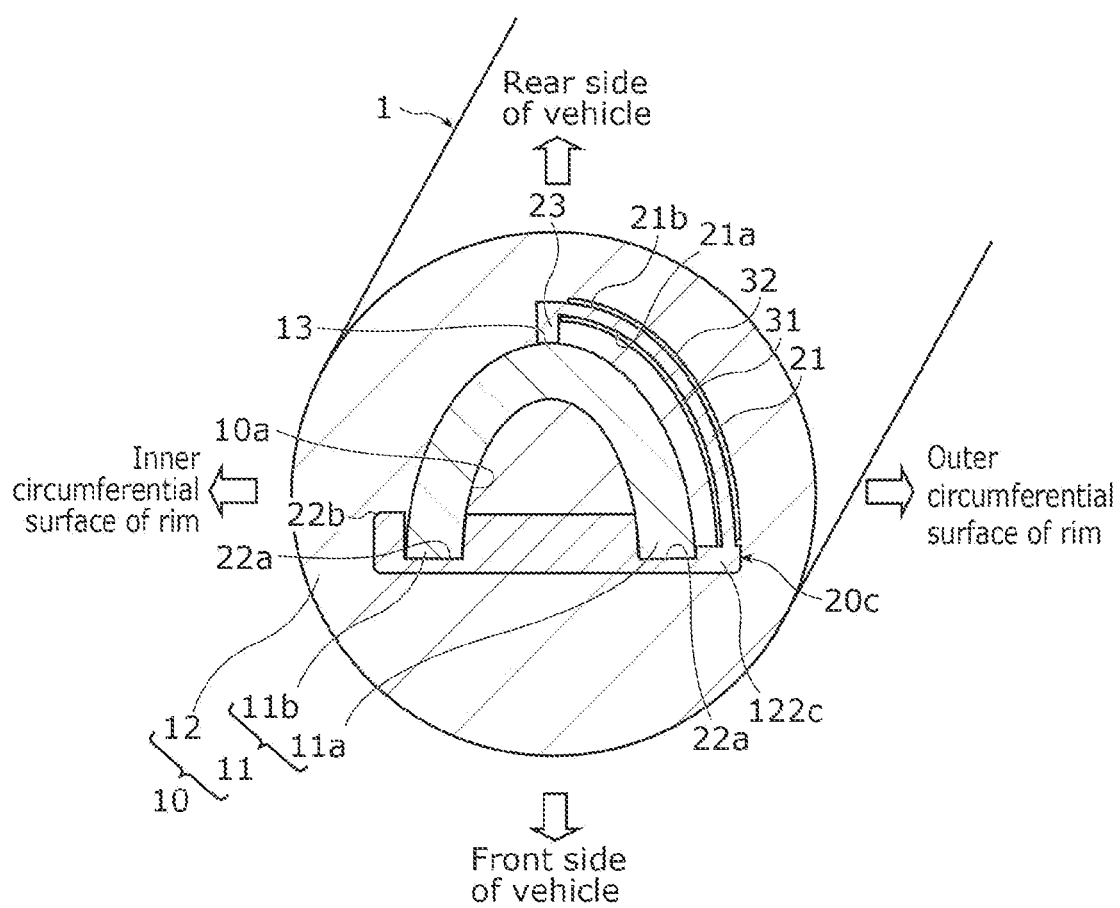
FIG. 8 is a cross-sectional view showing the steering wheel according to Variation 3 of the embodiment.

FIG. 8 is a cross-sectional view showing steering wheel 1 in Variation 3 of the embodiment.

As shown in FIG. 8, engagement portion 122c of the present variation is engaged with first portion 11a and second portion 11b of core metal 11. Specifically, engagement portion 122c extends from insulator 21 to second portion 11b via first portion 11a of core metal 11. In addition, two second recessed portions 22a are formed in engagement portion 122c. One second recessed portion 22a of two second recessed portions 22a engages with first portion 11a of core metal 11, and the other second recessed portion 22a of two second recessed portions 22a engages with second portion 11b of core metal 11. Accordingly, one second recessed portion 22a is coupled to first portion 11a of core metal 11, and the other second recessed portion 22a is coupled to second portion 11b of core metal 11, so that engagement portion 122c and core metal 11 can be coupled more firmly. For this reason, it is possible to prevent insulator 21 from being displaced with respect to core metal 11 or being rotationally displaced with respect to the circumferential direction of steering wheel 1 due to the pressure at the time of resin molding of steering wheel 1.

(Variation 4 of the Embodiment)

Electrode structure 20 and steering wheel 1a of the present variation are different from the electrode structure and the steering wheel of the embodiment in that an insulator separate from insulator 21 is provided. In the configurations and functions of electrode structure 20 and steering wheel 1 of the present variation, the same reference numerals are designated for the same configurations and functions as the configurations and functions of the electrode structure and the steering wheel of the embodiment, and the detailed description about the configurations and functions is omitted. In addition, in the present variation, insulator 21 is referred to as first insulator 21, and an insulator separate from insulator 21 is referred to as second insulator 29.

Figure 9:
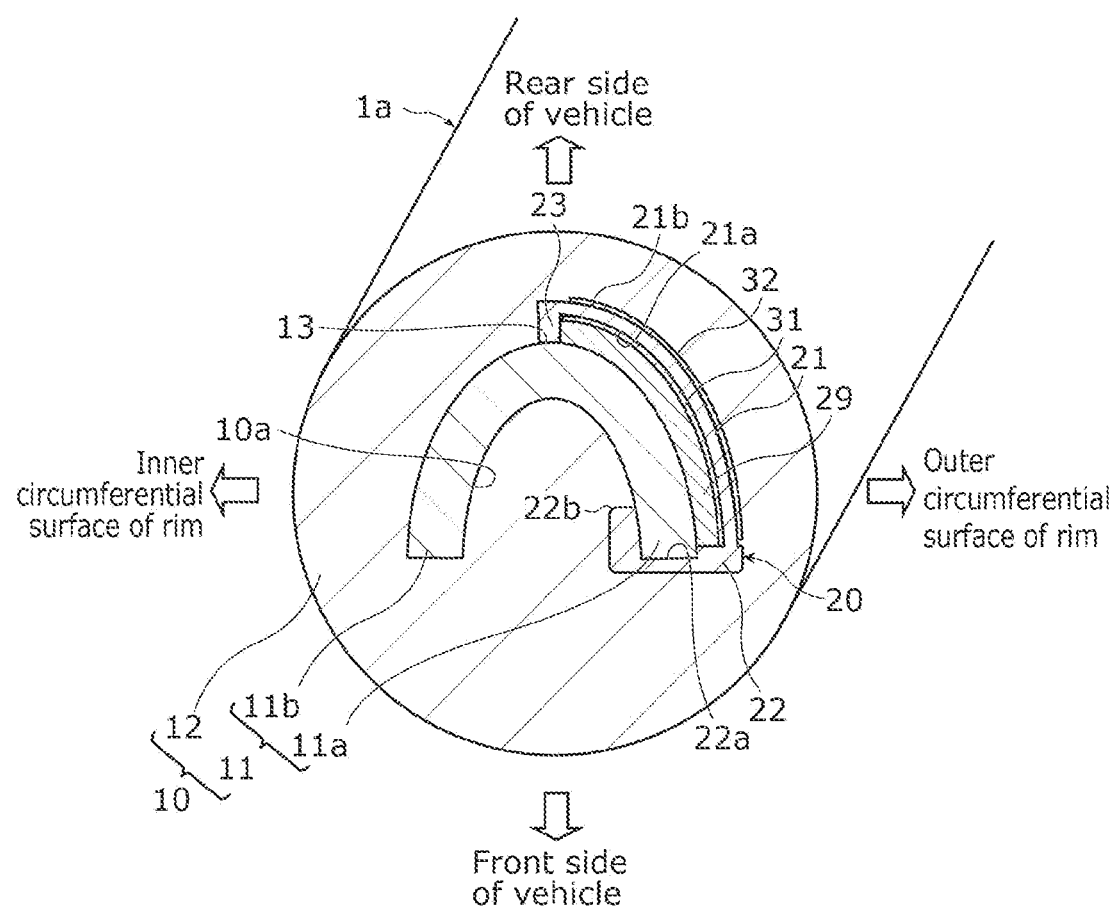
FIG. 9 is a cross-sectional view showing the steering wheel according to Variation 4 of the embodiment.

FIG. 9 is a cross-sectional view showing steering wheel 1a in Variation 4 of the embodiment.

In the present variation, as shown in FIG. 9, second insulator 29 is disposed between core metal 11 and first electrode 31. Specifically, second insulator 29 is of an annular shape and is disposed between core metal 11 and first electrode 31 along the surface on the outer circumferential side of core metal 11. That is, second insulator 29 is sandwiched between core metal 11 and first electrode 31. Accordingly, the space between core metal 11 and first electrode 31 can be filled with second insulator 29 so that foam 12 does not enter between second insulator 29 and core metal 11 and between second insulator 29 and first electrode 31.

In addition, second insulator 29 may be included in the components of electrode structure 20 or may be included in the components of steering wheel 1a.

In addition, second insulator 29 comprises a resin material such as a hard plastic such as polycarbonate, polybutylene terephthalate or the like.

Accordingly, the posture of first insulator 21 with respect to core metal 11 can be maintained so that first electrode 31 and core metal 11 do not come into contact with each other, so that a distance between first electrode 31 and core metal 11 can be firmly secured.

(Other variations)

Although the electrode structure, the steering wheel, and the method for manufacturing the steering wheel according to the present disclosure have been described above based on the above embodiments, the present disclosure is not limited to these embodiments. Forms obtained by applying various modifications to the embodiment conceived by a person skilled in the art without departing from the spirit of the present disclosure are also included in this disclosure.

For example, in the electrode structure, the steering wheel, and the method for manufacturing the steering wheel according to the above embodiment, the protrusion and the engagement portion may not be disposed at positions facing each other in the cross section of the steering wheel. Specifically, when a plurality of protrusions and a plurality of engagement portions are disposed in the insulator, the plurality of protrusions and the plurality of engagement portions may be disposed in the insulator so that the plurality of protrusions and the plurality of engagement portions do not correspond to each other. That is, in the cross section of the rim, only one of the protrusions disposed at the other end of the insulator and the engagement portion disposed at one end of the insulator may be disposed. For example, the four engagement portions and the six protrusions may not be disposed at positions where the protrusions and the engagement portions face each other in the cross section of the steering wheel. In this case, it is possible to prevent the fluidity of the injection-molded resin from being hindered when the foam is resin-molded.

In addition, in the electrode structure, the steering wheel and the method for manufacturing the steering wheel according to the above embodiment, the steering wheel may further include a control circuit.

It should be noted that forms obtained by applying various modifications to each embodiment described above conceived by a person skilled in the art or forms realized by arbitrarily combining the components and functions in each embodiment without departing from the spirit of the present disclosure are also included in this disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2021-139139 filed on August 27.

INDUSTRIAL APPLICABILITY

The electrode structure, the steering wheel and the method for manufacturing the steering wheel of the present disclosure can be applied to, for example, the steering wheel of a vehicle.

The invention claimed is:

1. An electrode structure disposed in a steering wheel provided in a vehicle, the electrode structure comprising:
    an insulator;
    a first electrode disposed on a first surface of the insulator, the first surface being a surface facing a core metal of the steering wheel;
    a second electrode disposed on a second surface, the second surface being a surface opposite to the first surface of the insulator;
    a protrusion protruding from the insulator toward the core metal; and
    an engagement portion that is engaged with the core metal, and wherein the engagement portion includes a second recessed portion that is engaged with a first recessed portion of the core metal.

2. The electrode structure according to claim 1, wherein in a cross section when the steering wheel is cut along a plane perpendicular to a circumferential direction of the steering wheel, the protrusion and the engagement portion sandwich the core metal, and the protrusion and the engagement portion are disposed at positions facing each other.

3. The electrode structure according to claim 1, wherein the core metal includes a curved portion in a curved shape in a cross section when the steering wheel is cut along a plane perpendicular to a circumferential direction of the steering wheel, and the protrusion is disposed at a position facing the curved portion.

4. The electrode structure according to claim 1, wherein the protrusion and the engagement portion are formed integrally with the insulator.

5. The electrode structure according to claim 1, wherein in a cross section when the steering wheel is cut along a plane perpendicular to a circumferential direction of the steering wheel, the insulator, the first electrode, and the second electrode are disposed at least in a range from an outer circumferential side of the steering wheel to a rear side of the vehicle in the steering wheel.

6. The electrode structure according to claim 1, wherein the protrusion and the engagement portion include curved surface portions in which corners of respective contours of the protrusion and the engagement portion are rounded.

7. The electrode structure according to claim 1, wherein the insulator comprises a resin material, the first electrode includes a plated metal, a metal sheet, or a metal plate, and the second electrode includes a plated metal, a metal sheet, or a metal plate.

8. The electrode structure according to claim 1, wherein an AC voltage is applied to the first electrode, the AC voltage having a same phase as a phase of an AC voltage applied to the second electrode.

9. A steering wheel comprising:
the electrode structure according to claim 1;
the core metal; and
a foam covering the electrode structure.

10. A method for manufacturing a steering wheel, the method comprising:
engaging the engagement portion included in the electrode structure according to claim 1 with the core metal; and
covering the electrode structure with a foam in a state where the engagement portion is engaged with the core metal.

* * * * *